United States Patent
Schatz et al.

(10) Patent No.: US 8,237,563 B2
(45) Date of Patent: Aug. 7, 2012

(54) UTILIZATION OF MOTION AND SPATIAL IDENTIFICATION IN MOBILE RFID INTERROGATOR

(75) Inventors: Steven V. Schatz, Cedar Rapids, IA (US); Gary Spiess, Lisbon, IA (US); Thaddeus Ternes, Mount Vernon, IA (US); Maury Anderson, Cedar Rapids, IA (US); Hunter Leland, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 788 days.

(21) Appl. No.: 12/371,429

(22) Filed: Feb. 13, 2009

(65) Prior Publication Data

US 2009/0207024 A1  Aug. 20, 2009

Related U.S. Application Data

(60) Provisional application No. 61/028,626, filed on Feb. 14, 2008.

(51) Int. Cl.
*G08B 13/14* (2006.01)

(52) U.S. Cl. ............. 340/572.1; 340/10.1; 340/572.7; 705/22; 701/300

(58) Field of Classification Search .... 340/572.1–572.8, 340/539.1, 10.1; 701/300; 705/22, 28
See application file for complete search history.

(56) References Cited

U.S. PATENT DOCUMENTS

| | | | |
|---|---|---|---|
| 6,204,765 B1 | 3/2001 | Brady et al. | |
| 6,476,756 B2 | 11/2002 | Landt | |
| 6,600,443 B2 | 7/2003 | Landt | |
| 6,909,366 B1 | 6/2005 | Marsh et al. | |
| 7,030,761 B2 | 4/2006 | Bridgelall et al. | |
| 7,119,738 B2 | 10/2006 | Bridgelall et al. | |
| 7,170,412 B2 | 1/2007 | Knox et al. | |
| 7,323,977 B2 | 1/2008 | Kodukula et al. | |
| 7,567,179 B2 * | 7/2009 | Stephensen et al. | 340/572.1 |
| 2006/0255951 A1 * | 11/2006 | Roeder et al. | 340/572.7 |
| 2007/0001814 A1 | 1/2007 | Steinke et al. | |
| 2007/0073513 A1 | 3/2007 | Posamentier | |
| 2007/0109128 A1 | 5/2007 | Fujii et al. | |
| 2007/0197229 A1 | 8/2007 | Kalliola et al. | |
| 2007/0213869 A1 | 9/2007 | Bandringa et al. | |
| 2007/0241904 A1 | 10/2007 | Ozaki et al. | |

(Continued)

FOREIGN PATENT DOCUMENTS

WO  WO-2005048476  5/2005

(Continued)

OTHER PUBLICATIONS

"A Giant Step for RFID," Mojix, Inc. http://www.mojix.com, copyright 2010, 1 page.

(Continued)

*Primary Examiner* — Eric M Blount
(74) *Attorney, Agent, or Firm* — Perkins Coie LLP

(57) ABSTRACT

A system and method of using motion or spatial identification technology with a mobile RFID reader to detect whether an RFID tag is part of a forklift load or other ambulatory space includes determining if a tag is within a defined space or if a tag is in motion relative to a mobile RFID reader. The system and method determines whether a particular RFID tag is part of a forklift load/space, has been added to or removed, is an extraneous tag, etc.

31 Claims, 13 Drawing Sheets

U.S. PATENT DOCUMENTS

| | | | |
|---|---|---|---|
| 2007/0272530 | A1 | 11/2007 | Miyoshi et al. |
| 2008/0111688 | A1 | 5/2008 | Nikitin et al. |
| 2009/0021376 | A1* | 1/2009 | Calvarese ............... 340/572.1 |
| 2010/0274641 | A1* | 10/2010 | Allen et al. ................. 705/13 |

FOREIGN PATENT DOCUMENTS

| | | |
|---|---|---|
| WO | WO-2007035833 A2 | 3/2007 |

OTHER PUBLICATIONS

"Alien—Intelligent Tag Radar," www.alientechnology.com/docs/products/AppNote_ITR.pdf, copyright 2008, 3 pages.

"How Mobile RFID Systems Improve Operations and ROI," http://www.sparkmedialab.com/intermec/First/ENG/mobile.html, Edition 1, 2007, 3 pages.

"Long Range RF Combat Identification Tag," Spectra Research http://www.spectra-research.com/sppdf/RFtag$_{13}$ flyer.pdf, 2005, 2 pages.

"Real Time Locating Systems Using Passive Tags—High Volume RTLS?" IDTechEx, http://www.idtechex.com/research/articles/real_time_locating_systems_using_passive_tags_high_volum_rtls_00001005.asp, copyright 1999-2011, 3 pages.

"RFID-radar(tm)—How it works," Trolley Scan (Pty) Ltd., http://www.rfid-radar.com/howworks.html, accessed May 24, 2011, 5 pages.

RF Controls—Welcome to RF Controls, http://www.rfctrls.com, copyright 2008-2011, 1 page.

S5 Systems, "Providing Custom Mobile and Embedded development services," http://www.s5systems.com/products/assettracking.html, accessed May 31, 2011, 1 page.

* cited by examiner

UTILIZATION OF MOTION AND SPATIAL IDENTIFICATION IN MOBILE RFID INTERROGATOR

CROSS-REFERENCE TO RELATED APPLICATIONS

This application claims the benefit of U.S. Provisional Application No. 61/028,626, entitled "UTILIZATION OF MOTION AND SPATIAL IDENTIFICATION IN MOBILE RFID INTERROGATOR", filed Feb. 14, 2008, and is hereby incorporated by reference.

BACKGROUND

Forklift-mounted and other types of mobile RFID systems encounter difficulties in determining which tagged items are loaded and which are not. Under certain conditions RFID readers may read tags which are far away as legitimately loaded items. Extraneous tag reads like these are difficult to filter out using current technology and introduce significant inaccuracies into the system.

Typically, software filtering based upon pick lists and hysteresis has been used to eliminate the detection of extraneous tags. However, the software involves modification to the application or the backend system that requires the data.

Complex antenna schemes which only allow tags within a well-defined space of the forklift load area to be read have been used. However, these systems tend to be unreliable and expensive to produce and install.

There is a need for a system that overcomes the above problems, as well as providing additional benefits. Overall, the above examples of some related systems and associated limitations are intended to be illustrative and not exclusive. Other limitations of existing or prior systems will become apparent to those of skill in the art upon reading the following Detailed Description.

DETAILED DESCRIPTION

Figure 1:
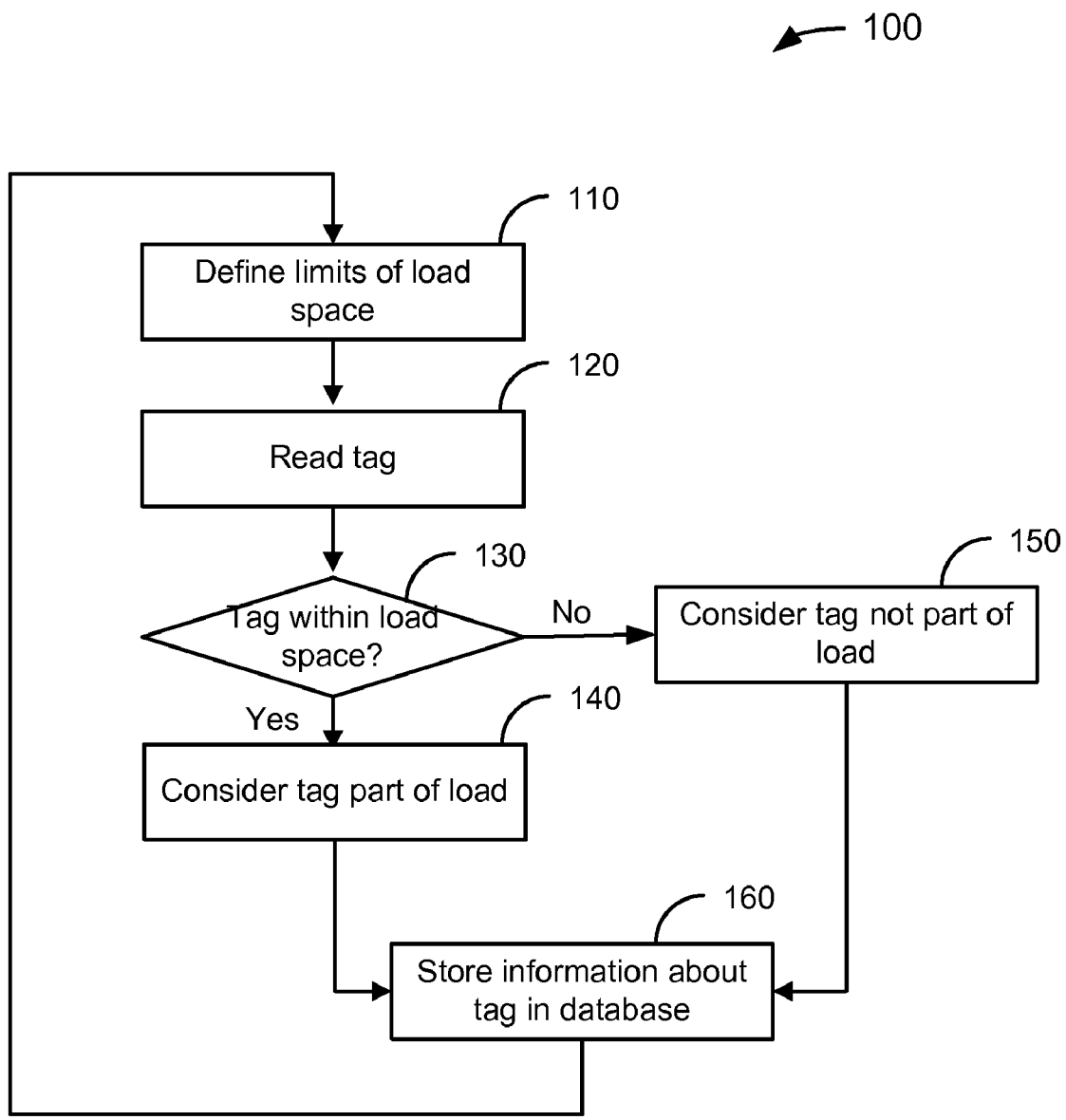
FIG. 1 is a flow chart illustrating an example of a method of determining which RFID-tagged packages are on a forklift using a volume sensor.

Described in detail below is a method and system of using motion and/or spatial identification technology to determine if a mobile RFID reader is in motion and also to determine whether a particular RFID tag is part of a forklift load, has been added to or removed from the forklift load, or is an extraneous tag.

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

It would be useful to know the location of RFID-tagged packages in places like warehouses or distribution centers where there are a large number of tagged packages. In addition, the packages may be moved from one location to another, for example, to complete orders or to place packages into an order processing queue. Forklifts may be used to move large quantities of tagged packages. An RFID reader, whether mobile or stationary, may under certain conditions erroneously read and identify an extraneous tag as part of the forklift load when the tag is actually located on a shelf or elsewhere in the warehouse. Thus, there is a need for a system that can reliably provide information, for example to a forklift operator or to a database, as to what is being carried on a particular forklift load.

Spatial identification technology (SID) may be used to define a space in front of a forklift as a "load space," where the load space may be either a certain volume or area in front of the forklift. Packages within that volume or area in front of the forklift are considered on the load, while packages outside of that area are considered not on the load. SID may also be used to detect when a tagged item is in motion and a tagged item's proximity to the reader antenna. SID may include, but is not limited to, traditional motion sensors using infrared light or laser technology, vibration sensors, gyroscopes, and accelerometers. SID may be built into an RFID reader system or alternatively be a separate system or sensor (e.g., be built within a vehicle).

The following three published documents discuss SID in greater detail and are incorporated by reference: (1) U.S. Pat. No. 6,600,443, entitled, "Method and Apparatus to Determine the Direction to a Transponder in a Modulated Backscatter Communication System", filed Oct. 18, 2002; (2) U.S. Pat. No. 6,476,756, entitled, "Method and Apparatus to Determine the Direction to a Transponder in a Modulated Backscatter Communication System", filed Jun. 4, 2001; and (3) PCT Publication No. WO 2007/035833, entitled, "Method, Apparatus, and System for Selecting and Locating Objects Having Radio Frequency Identification (RFID) Tags.

FIG. 1 illustrates an example volume sensor detection process 100 that uses a volume sensor with a forklift-mounted RFID reader for detecting extraneous tags and determining which RFID-tagged packages are on a forklift. At block 110, the limits of a load space, such as the volume of space in front of and on a forklift, are defined. For example, the positional data of the corners of the selected load space are determined and stored for use by the RFID reader. Positional data may comprise distance from and angle with respect to the mounted RFID reader. Alternatively, dimensions of the load space can be entered into the database together with a reference point on the forklift for defining the load space, such as the mounted RFID reader. At block 120, using SID, an RFID tag potentially located in the load space is read by an RFID reader on the forklift.

At decision point 130, it is determined whether the tag read by the RFID reader is within the load space defined at block 110 by using a SID-based volume sensor. For example, the distance from and angle with respect to the mounted RFID reader of the RFID tag are determined and compared to the positional data of the corners of the defined load space. The distance between the RFID tag and the RFID reader may be determined in many ways. For example, the RFID reader may contain logic for determining the distance based upon the received signal strength. Alternatively, the RFID reader may include two or more antennas that have known separations. Based upon the signal strength received at each of the antennas and the lag time between detecting an RFID tag's presence at each antenna, the system may triangulate the location of the RFID tag to give higher resolution as to the proximity of the RFID tag from the reader. The angle of the RFID tag with respect to the RFID reader may be determined as described in the above referenced publications.

If at decision point 130, it is determined (block 130—Yes) that the tag is within the load space of the forklift, at block 140, the tag, and thus the package to which the tag is attached, is considered part of the forklift load. At block 160, the determination that the tag is considered part of the load is stored in a database for use by the RFID system in routing tagged packages. The process continues in the same manner with other RFID tags by returning to block 110. Because the limits of the forklift load space may change due to movement of the forklift, at block 110, the limits of the forklift load space are re-defined for use in determining whether the next RFID tag is part of the load or not.

If at decision point 130 it is determined (block 130—No) that the tag is not within the load space of the forklift load, at block 150, the tag and its corresponding package are not considered part of the forklift load. At block 160, the determination that the tag is not considered part of the load can be stored in a database for use by the RFID system in routing tagged packages. The particular RFID tag may be an extraneous tag identified by the RFID reader due to RF reflections or other RF noise in the warehouse environment and may be safely excluded from the forklift load. The process continues in the same manner by returning to block 110 to re-define the limits of the forklift load space for use in determining whether the next RFID tag is part of the load or not.

Figure 2:
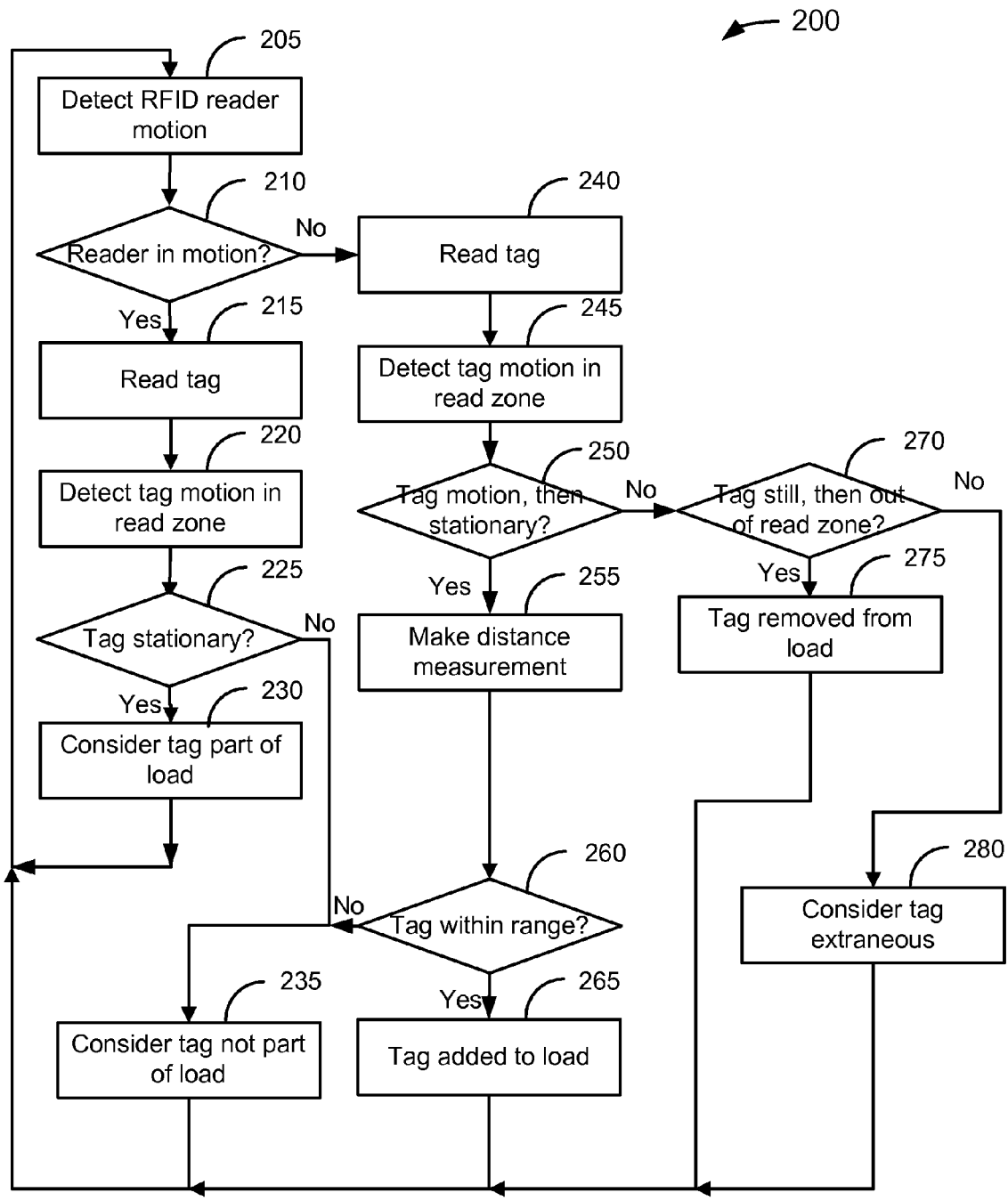
FIG. 2 is a flow chart illustrating an example of a method of determining which RFID-tagged packages are on a forklift using a motion sensor.

FIG. 2 illustrates an example motion sensor detection process 200 that uses a motion sensor for detecting extraneous tags and determining which RFID-tagged packages are on a forklift.

At block 205, a motion sensor detects motion of an RFID reader mounted on, for example, a mobile forklift. Possible ways of detecting motion of a forklift include, but are not limited to, taking an electrical signal on the forklift (e.g. from its speedometer) which indicates it is in motion and feeding the signal into the RFID reader either through a general purpose input/output terminal or a dedicated input; using a traditional motion sensor based upon infrared light, laser light, or vibration, a gyroscope, an accelerometer, etc. and feeding the obtained signal from the sensor into the RFID reader; and integrating a traditional motion sensor, accelerometer, or sensor using ultrasonic waves into the RFID reader.

Data from the motion sensors can be sent to a processor that may or may not be part of the RFID reader. Additionally, a range of possible movement profiles can be constructed and stored in a memory accessible by the processor for comparison to the data from the motion sensors. A movement profile can define a range of sensor data or a sequence of sensor data that indicate a match condition that the forklift or other vehicle on which the RFID reader is mounted is moving. For example, a match condition could be as simple as movement in the forward direction faster than one meter per second for more than a second.

Figure 11A:
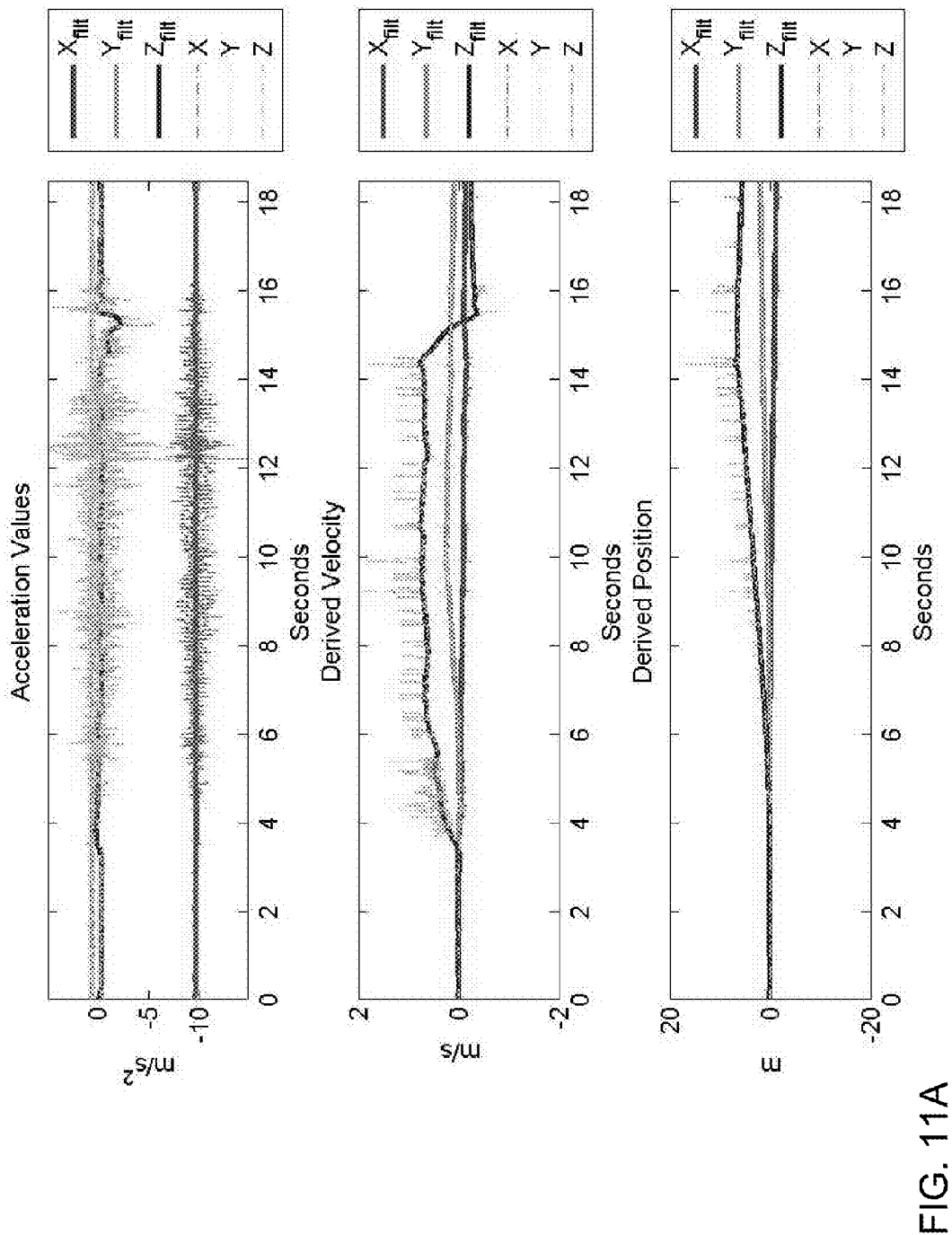
FIGS. 11A and 11B show measured accelerometer data and derived velocity and position data.
Figure 11B:
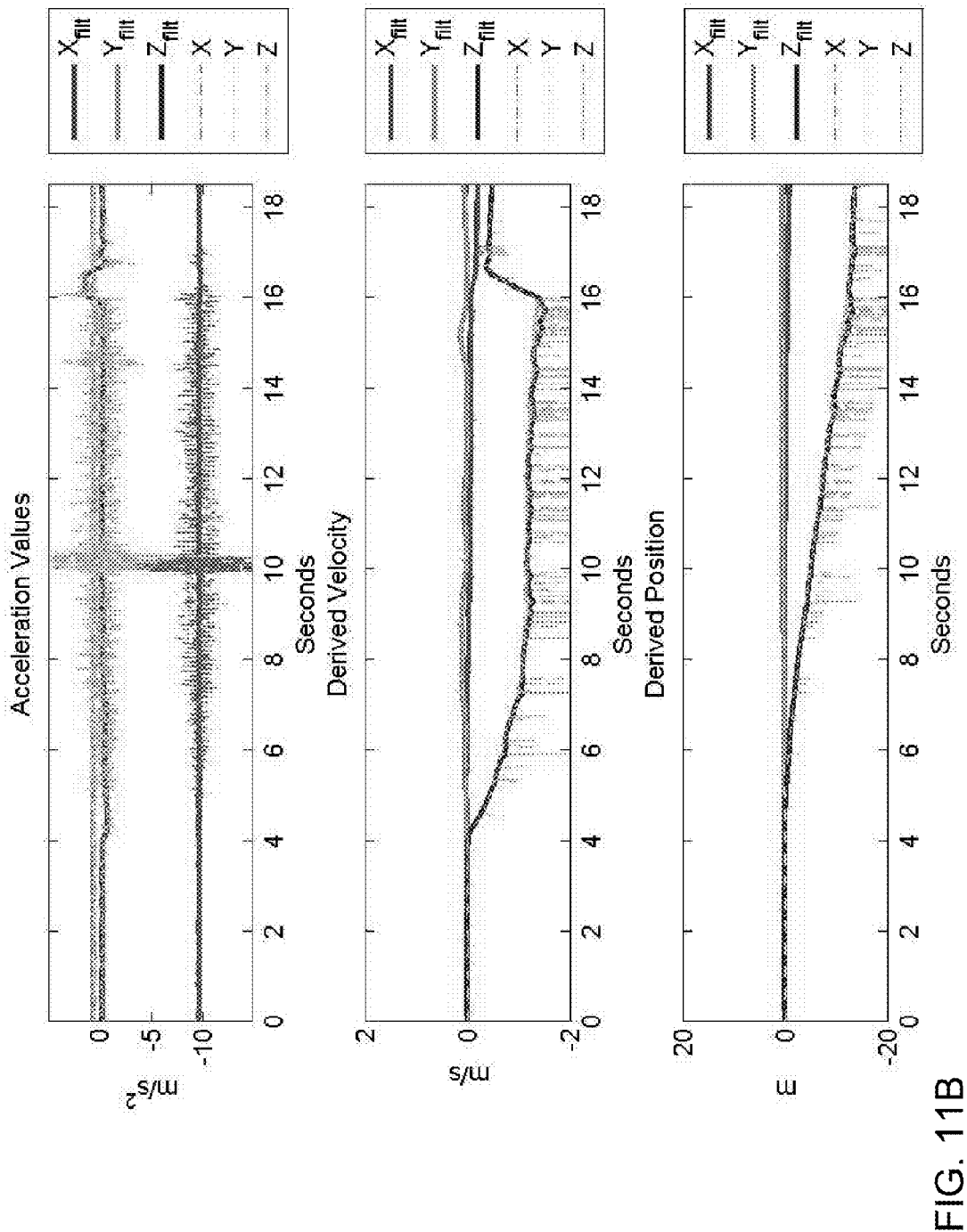

As another example, acceleration of a forklift can be measured by a tri-axial accelerometer. The acceleration values can be integrated and filtered with a low-pass filter to derive the speed and the position of the forklift along three axes. Two examples of accelerometer data and derived speed and position data are shown in FIGS. 11A and 11B, where the acceleration data for the x-, y-, and z-axes are shown in the top graph, and the derived velocity and position data are shown in the middle and bottom graphs, respectively. Using the sensor accelerometer data and the derived velocity and position information, the system can determine when the forklift is moving forward or backward faster than 1 meter per second over a time span of at least one second. Moreover, the data measured for three axes can be matched to different movement profiles including, but not limited to, matching x-axis data to determine that a forklift is picking up a load, matching z-axis data to determined that a forklift truck is backing out, and matching y- and z-axis data to determine that the forklift truck is making a turn, for example a 90 degree turn. The data processor collects and processes motion sensor data, and once a match condition occurs, the processor generates an event to the RFID reader, such as reading a tag in block 215 of process 200.

Alternatively, SID can be used to detect an untagged item moving in the antenna read zone of the RFID reader. A SID-based method would be applicable in a situation where the forklift moves past poles, shelving, or other stationary items in the warehouse or distribution center. Additional processing such as filtering, hysteresis, or heuristics could be applied to the SID motion trigger to increase the confidence of the stationary-motion decision.

At decision point 210, the system determines whether the RFID reader is in motion. If it determines (block 210—Yes) that the RFID reader is in motion, at block 215, an RFID tag in the read zone of the RFID reader is read. At block I, any motion of the tag is detected in the read zone through the use of SID. The read zone may be an area in front of or near the RFID reader's antenna or antennas where RFID tags may be reliably interrogated. Alternatively, the read zone may be narrowed by using multiple antennas to determine the distance a tag is from the RFID reader and only reading tags within a certain distance of the reader.

Figure 3A:
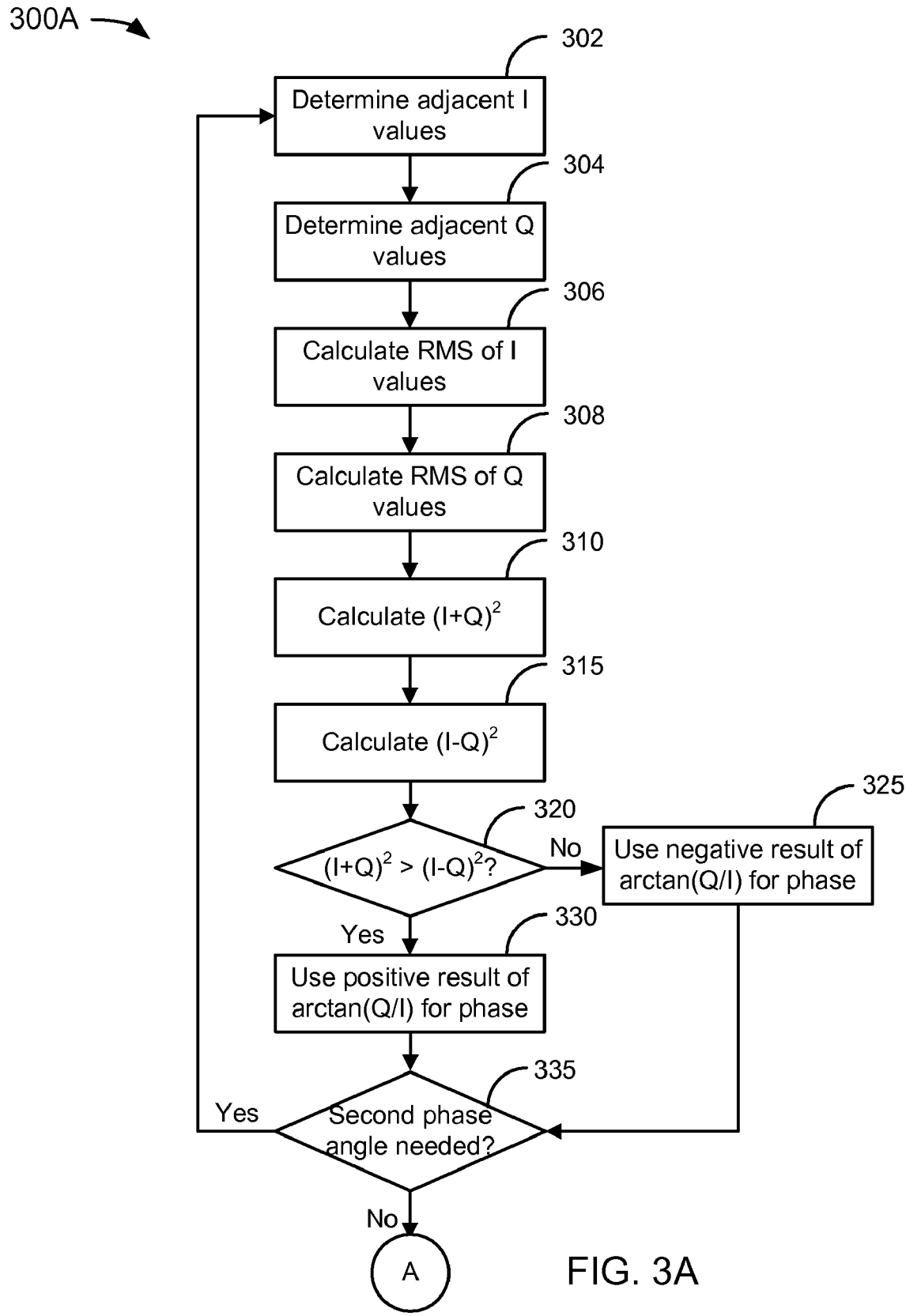
FIGS. 3A and 3B show a flow chart illustrating an example of a method of determining the motion of an RFID tag by measuring the change of the phase angle of the tag response.
Figure 3B:
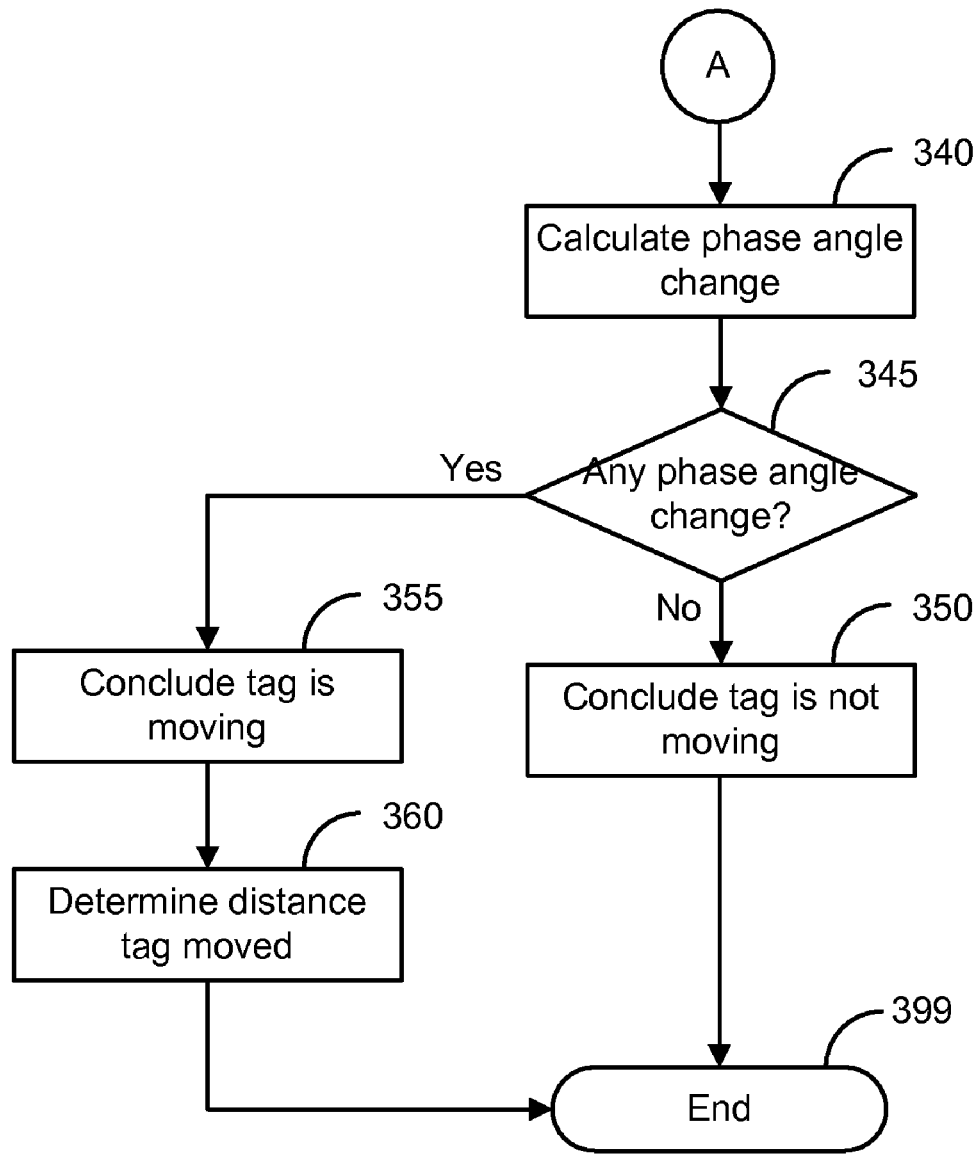

Motion of RFID tags can be detected by using any of the techniques described above for measuring distance and angle of the RFID tag, for example relative to the RFID reader, and determining that a change has occurred. Motion of an RFID tag can alternatively be determined by measuring the change of the phase angle during an RFID tag response to an RFID reader query. FIGS. 3A and 3B illustrate one example of an RFID tag motion detection process 300 using phase angle measurements.

When an RFID tag responds to a reader query, the RFID reader hardware presents the firmware with a digitized complex signal that has an I (in-phase) component and Q (quadrature) component. Because the values for I and Q may be noisy, multiple adjacent I,Q values in the vicinity of the preamble of the tag response should be used, for example by taking the root mean square (RMS) value of several adjacent I samples as the I value and the RMS value of several adjacent Q samples as the Q value.

At blocks 302 and 304, the system reads or obtains several adjacent I and several adjacent Q components from a tag read. Then at blocks 306 and 308, the RMS value of the I samples and the RMS value of the Q samples are calculated. The RMS values of I and Q will be referred to as simply I and Q in the following description for simplicity of notation. The magnitude of the tag response is referred to as received signal strength indication (RSSI) and is given by the square root of $(I^2+Q^2)$ The phase angle of the tag response in radians is given by the arctangent of (Q/I).

To determine the phase angle within a 360 degree range, a specific location in the preamble of the tag response may be selected, and the relationship of I and Q to zero at that location determined. This enables the correct quadrant of the tag response phase angle to be selected, and by determining phase change between quadrants, the system can quickly and accurately determine that a tag has moved. However, because the values of I and Q are both subject to random noise, the quadrant may be incorrectly determined for any single I,Q pair. Part of the problem can be corrected by ignoring the absolute relationship of I and Q to zero and using just the relationship of I and Q to each other, that is, whether I and Q have the same sign or different signs. Consequently, the range of the phase angle determination is limited to 180 degrees (two quadrants) rather than 360 degrees (four quadrants). The quantities $(I+Q)^2$ and $(I-Q)^2$ are calculated at blocks 310 and 315. Then by comparing the magnitudes of these quantities, the system can determine whether I and Q have the same or different signs.

At decision block 320, the system determines if $(I+Q)^2$ is greater than $(I-Q)^2$. If $(I+Q)^2$ is greater than $(I-Q)^2$ (block 320—Yes), then I and Q have the same sign, and at block 330, a positive sign is chosen for the phase angle given by arctan (Q/I). If $(I+Q)^2$ is less than $(I-Q)^2$ (block 320—No), then I and Q have opposite signs, and at block 325 a negative sign is chosen for the phase angle given by arctan(Q/I).

The process continues to decision block 335 from either block 330 or block 345 where the system determines if a second phase angle measurements needs to be measured. A second phase angle measurement is needed to determine any change in the phase angle in the tag response. If a second phase angle measurement is needed (block 335—Yes), the process returns to block 302 to acquire a second set of I and Q pairs. If a second phase angle measurement is not needed (block 335—No), at block 340 the phase angle change is calculated by subtracting the second calculated phase angle from the first calculated phase angle.

Then at decision block 345, the system determines if there has been any change in the phase angle. If there has been no change in the phase angle (block 345—No), at block 350 the system concludes that the tag is not moving, and the process ends at block 399.

If there has been a change in the phase angle (block 345—yes), at block 355 the system concludes that the tag is moving.

At block 360, the system determines the distance the tag moved based upon the calculated phase angle change, and the process ends at block 399.

The phase angle change is very sensitive to movements of the RFID tag over distance. For example, at a radio frequency of 865 MHz, the wavelength is 347 mm. Thus, the 180 degree range measured is covered over a travel distance of 173 mm of the tag. Because the phase of the RFID tag response arises from the distance the signal travels, and the distance is the path from the RFID reader to the tag and back again, the phase will undergo a change through 180 degrees when the distance between the reader and the tag changes by 87 mm. For an RFID reader operating at 915 MHz, a phase change of 180 degrees will occur over a reader-to-tag distance change of 82 mm. Consequently, the resolution will be slightly better for higher operating frequencies.

Experimentally, repeatability of phase angle measurements showed a variance of about ±5 degrees between a reading at the beginning of the tag response and one at the end of the tag response. Given this particular measured variance in phase angle measurement, to determine that a tag has moved the system may detect a change in phase angle that exceeds a predetermined error probability. For example, a phase angle change of 5.625 degrees (180 degrees/32) should be sufficient to indicate that the tag has moved. This is equivalent to a movement of 2.71875 mm by the tag directly toward the reader at 865 MHz.

A single dense reader mode (DRM) tag response is 1.8 ms, thus, if the RFID tag were required to move 2.71875 mm during this period of time, for reliable detection of motion the rate of speed should be approximately 1.5 m/s. A speed of 1.5 m/s may be the slowest speed that a tag might be expected to move in a warehouse environment while aboard a forklift truck. By decreasing the minimum speed to 1 m/s, for a movement of 1.8 mm, the error in phase angle measurement can be reduced to +2 degrees. The variance of the phase angle measurements may be dependent upon many factors including, but not limited to, the strength of the tag signal and environmental noise. Consequently, the variance in phase angle measurements may be different from the experimentally measured value given here.

In testing, the RSSI for the RFID reader used to make the above measurements was strong and above −40 dBm, but the noise floor was measured at −62 dBm. As a result, noise became a significant part of the computations. Typical RFID readers have lower noise variances that will allow detection of smaller distances traveled by a tag. Further, if a tag responds with FM0 modulation, the response time can be much shorter than 1.8 ms. Consequently, a lowest speed tag that can be detected with FM0 modulation can be much higher.

One experiment was performed with an Intermec IM5R2 865 MHz RFID reader having an unlabeled RF antenna and configured to operate in DRM (dense reader mode) such that a queried RFID tag would respond with Miller modulation having an M value of 4. An RFID tag was initially placed three feet from the reader and then moved away from the reader approximately one inch at a time. At each position of the tag, the reader was operated for several seconds to obtain several phase readings. No measurements of phase changes were made while the tag was in motion. During the experiment, three RFID tags from unknown locations also responded to the reader's queries. These three tags had weaker signals of 26 dB, 30 dB, and 34 dB and were used to provide a reference of statically positioned tags.

Figure 4:
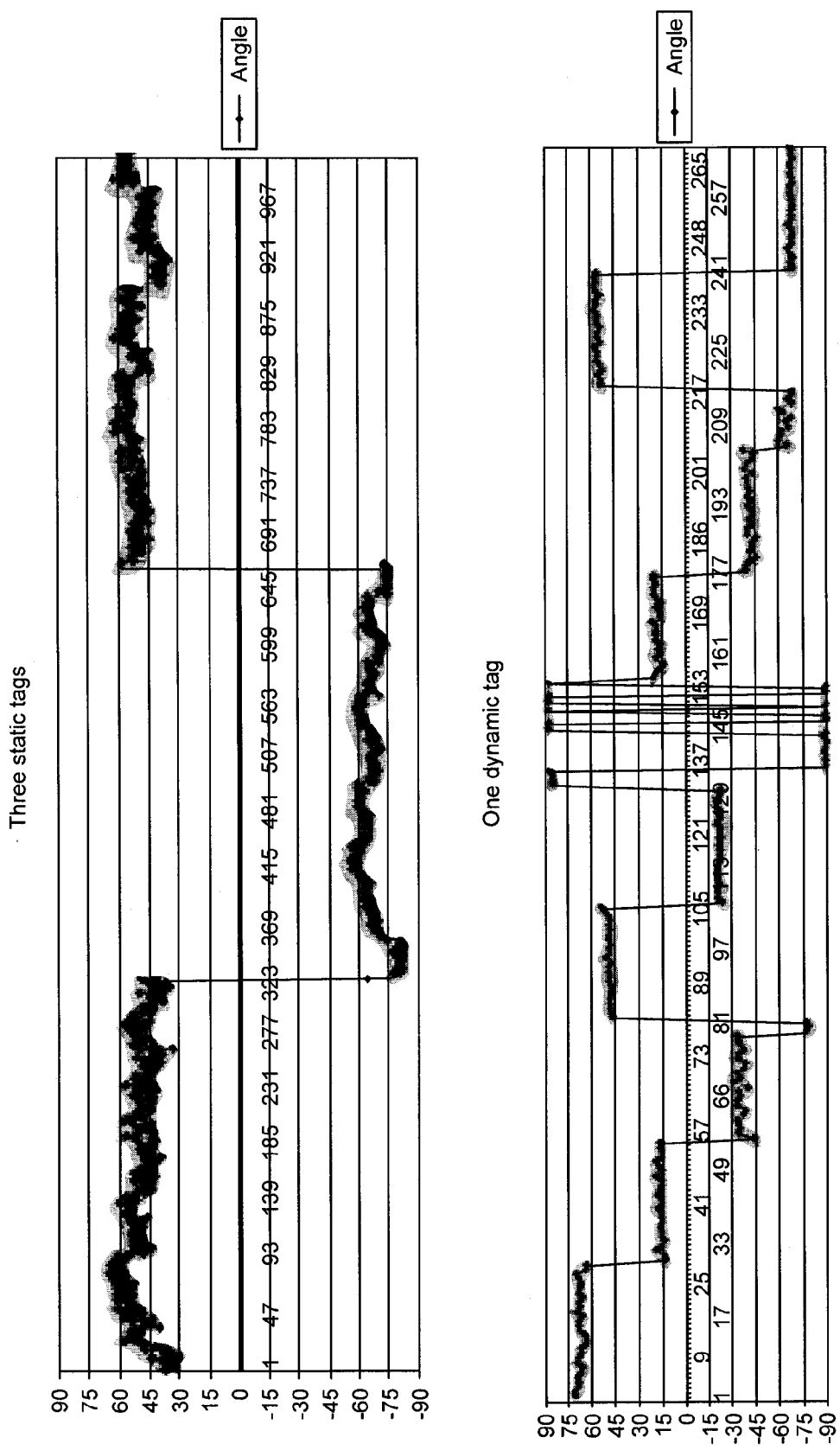
FIG. 4 shows phase angle measurements taken of three stationary tags (top graph) and one tag moved discrete distances (bottom graph).

The top graph in FIG. 4 shows the phase angle measurements for the three stationary tags. Each tag's phase angle exhibited a tendency to wander during the experiment and could be attributed, at least in part, to an uncontrolled environment and movement of the experimenter during the course of the experiment. For example, the phase angle measurements for the tag shown in the middle of the top graph shows that the phase angle changed in steps as the experimenter stopped the phase measurements to move the RFID tag being tested. Because the signal strength and the phase angle of the tags change over time, measurements should be taken over as short a time interval as possible.

The bottom graph in FIG. 4 shows the phase angle measurements taken for the non-stationary tag being tested. The x-axis represents the number of each tag read, and the y-axis represents the phase angle. A total of 13 measurements were taken; each measurement corresponded to the tag being moved from 0 to 12 inches at one inch intervals and starting at a distance of 36 inches from the RFID reader antenna. The one-inch movements of the tag were made manually and thus were not closely controlled during the experiment. At three inches (near x=80) the tag was barely readable and few readings were obtained, while at 11 inches (near x–240), there were no readings. Multipath signal cancellation from metallic objects near the reading site could be a contributing factor to the lack of readings and barely readable tag, but it should be noted that multipath cancellation is not related to detecting motion of an RFID tag based upon changes in phase angle measurements. At six inches, the phase angle was approximately 90 degrees and wrapped to approximately –90 degrees. The relatively large swings shown on the graph for the six inch distance only represent a few degrees of movement. The change in phase angle is consistent with the above predictions: a rotation through 180 degrees only required a movement of the tag of slightly more than three inches. Further, the phase angle measurements wander over a range of only a few degrees.

Figure 5:
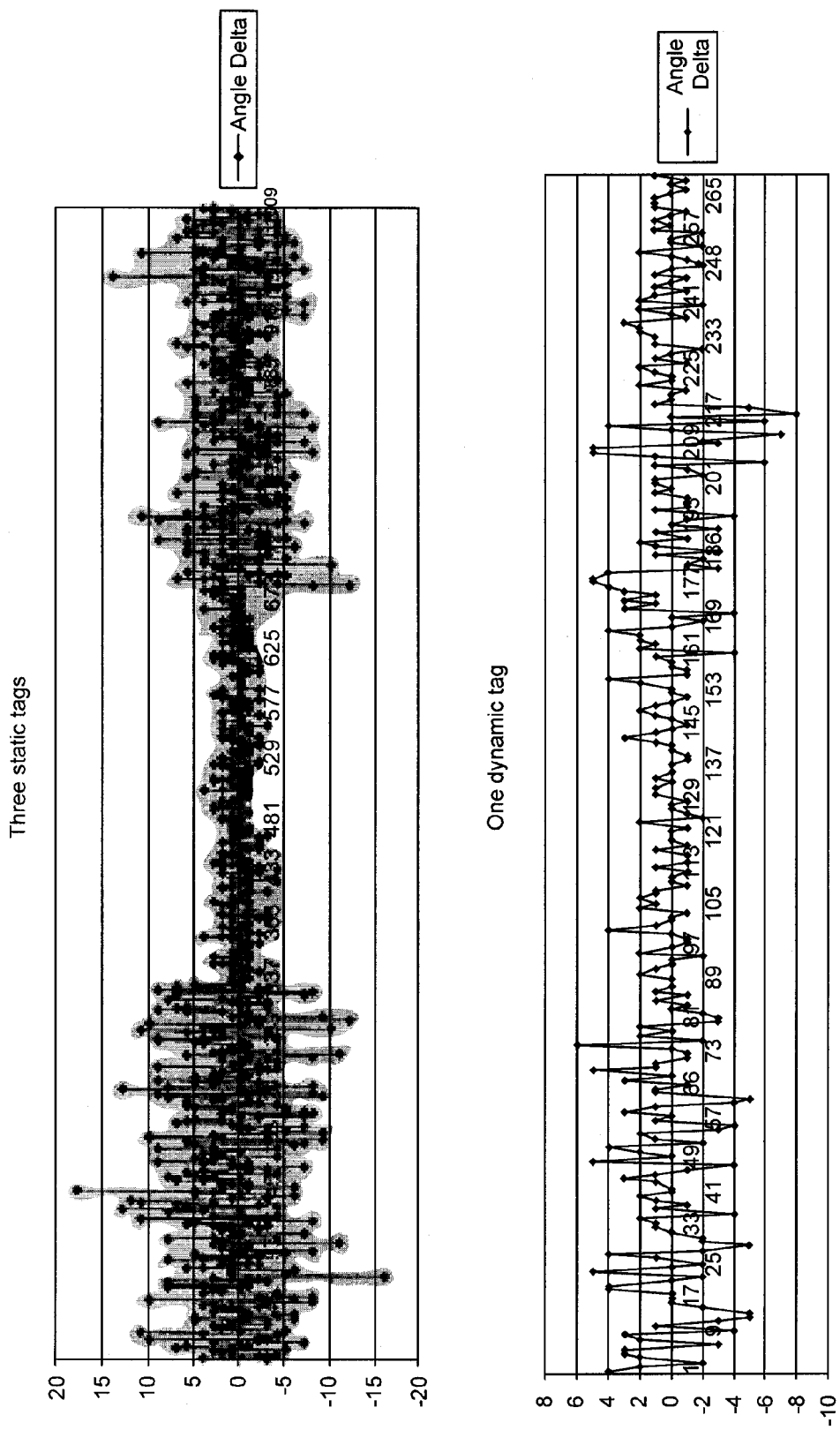
FIG. 5 shows variations in phase angle between measurements taken at the beginning of a tag response and measurements taken at the end of a tag response for stationary tags (top graph) and a tag moved discrete distances (bottom graph).

The graphs in FIG. 5 show the variance, in degrees, of the phase angle measurements between a measurement taken at the beginning of the tag response and one taken at the end of the response. The top graph in FIG. 5 shows the phase angle variances for the three stationary tags in the same order as shown in the top graph for FIG. 4 The signal strength of the first tag was 26 dB, the second tag was 34 dB, and the third tag was 30 dB. This graph provides a good indication of how 18 dB of noise affects the phase determination of signals of varying strength.

The bottom graph in FIG. 5 shows the variance of the phase angle measurements for the dynamic tag under test. Note that there is no longer any clear step motion visible for each position of the tag. The error is approximately 4 degrees or less, but can be larger at times.

Figure 6:
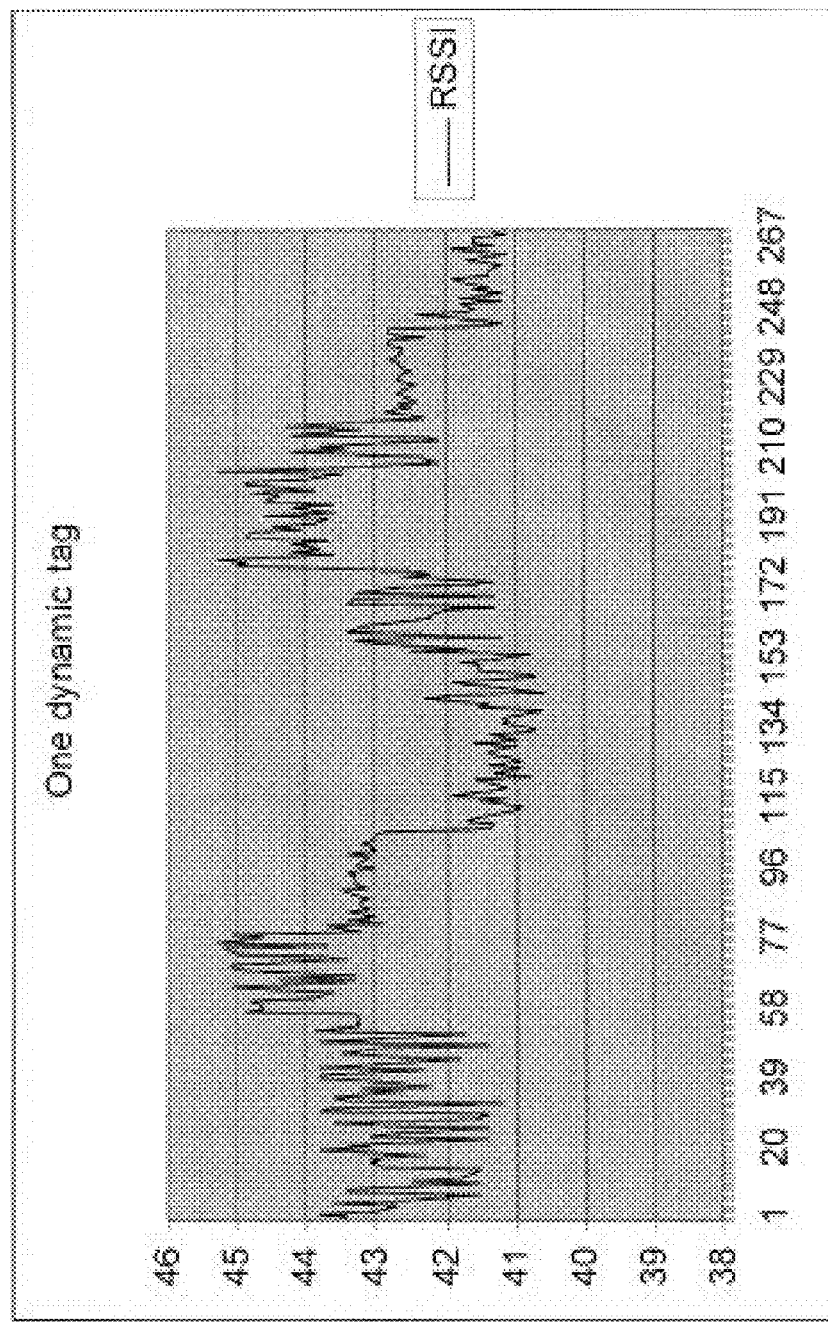
FIG. 6 shows the received signal strength indication measurements for a tag moved discrete distances.

In FIG. 6, the RSSI of the tag is shown for the non-stationary tag under test. The RSSI varies periodically between 41 dB and 45 dB. A phase angle rotation may not cause a large change in magnitude. Because the RSSI variation is periodic, multipath effects could alternately add to and subtract from the main signal. If multipath effects affect the RSSI by such a large amount the phase angle may not be affected to as great a extent. These results show that using RSSI alone to determine tag movement can be insufficient.

At some distances, the RSSI varied a little, and at many distances, the RSSI varied widely. Although many factors can give rise to this result, one contributor may be the phase angle of the noise. In the IM5R2 RFID reader used in the experiment, a contributor to noise was the reader's own reflected carrier wave. The carrier can be reflected by an impedance mismatch between the power amplifiers and the antenna, and the phase of the noise can change predictably as the carrier frequency is changed. At some frequencies, either I or Q will become highly noisy. The experiment was conducted at only one frequency, and I and Q were both impaired with between 14 dB and 22 dB of noise.

Figure 7:
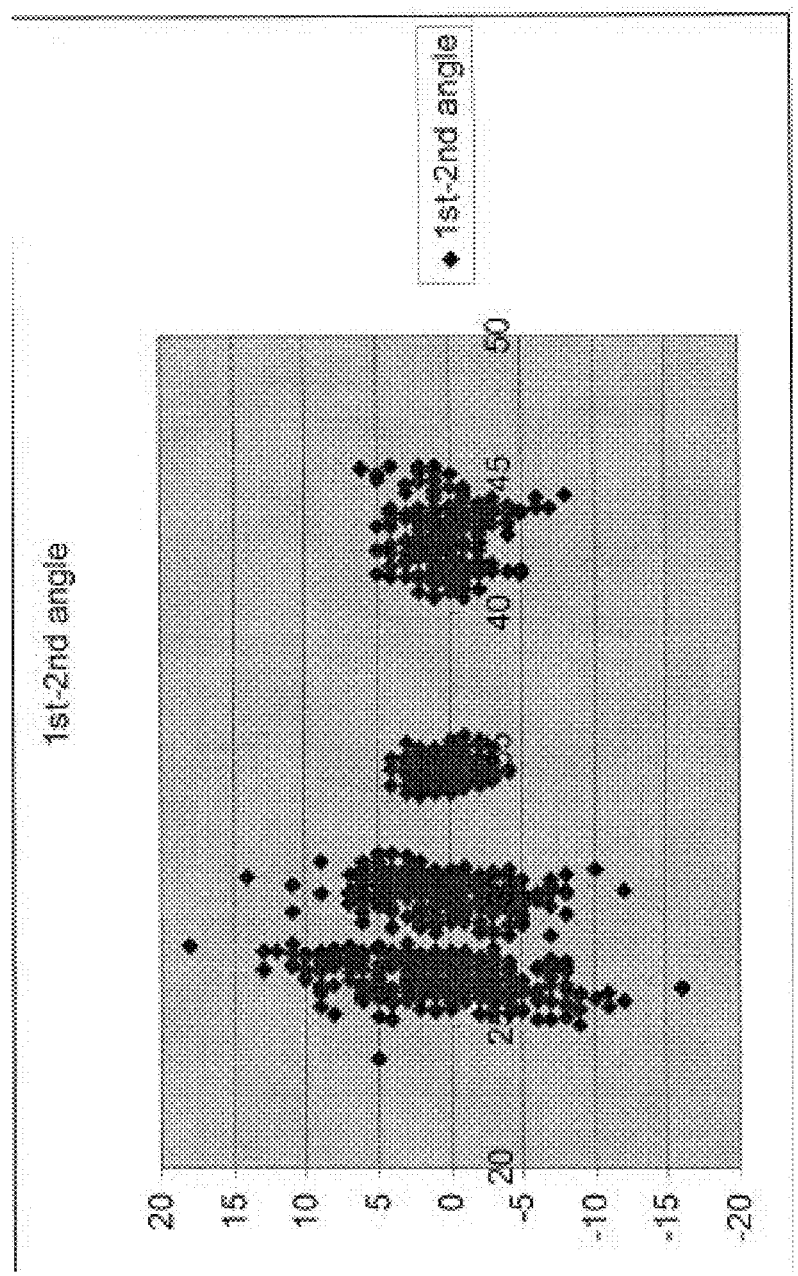
FIG. 7 shows a graph of measured phase angle difference as a function of received signal strength indication measurements.

FIG. 7 shows a graph where the measured RSSI is shown on the horizontal axis, and the corresponding phase angle difference is shown on the vertical axis. The measurements for all four tags are shown. The closest grouping corresponds to the tag having a response strength of 34 dB. Lower power tags have increasingly larger errors, as expected. The dynamic tag under test shows larger errors as the signal strength is increased. Because 45 dB is close to the largest signal that can be measured with the equipment used for this experiment, excessive gain can cause the signal to be clipped. Clipped signals will have increasingly dubious magnitudes and phase angles.

Measurement of the change of the phase angle of an RFID tag response can be implemented not only by one or more microprocessors, but also in firmware for the digital signal processor of an RFID reader. Alternatively, the measurement procedure can be programmed into a field-programmable gate array (FPGA).

Continuing with the process 200 in FIG. 2, at decision point 225, the system determines whether the RFID tag is stationary. If the system determines (block 225—Yes) that the tag is stationary within the read zone, at block 230 the tag and corresponding package are considered part of the load being carried by the moving forklift. This information is stored in a database for use by the RFID system in tracking tags and packages. If the system determines (block 225—No) that the tag is moving within the read zone, at block 235 the tag and its package are not considered part of the load being carried by the moving forklift. Again, this information can be stored in a database for use by the RFID system. This may happen in the case of reading extraneous tags, perhaps on a warehouse shelf, as the forklift is moving past the shelf. Thus, the extraneous tag and package may safely be excluded from the forklift load.

Whether the tag is considered part of the load at block 230 or not part of the load at block 235, the process returns to block 205 where the motion sensor again detects motion of the RFID reader.

If the system determines (block 210—No) that the RFID reader is not in motion, at block 240, an RFID tag in the read zone of the RFID reader is read. At block 245, any motion of the tag is detected in the read zone through the use of SID.

At decision point 250, the system determines whether the tag was in motion within the read zone and then became stationary within the read zone. If it determines (block 250—Yes) that the RFID tag moved and then became stationary within the read zone, then at block 255, a distance measurement between the tag and the RFID reader is made. A distance measurement may be made by employing SID-based techniques where the background noise detected by the RFID reader changes as the local environment of the mobile RFID reader changes. For example, an RFID reader mounted on a mobile forklift may detect different background noise when moving between shelves packed with tagged packages or when traveling down a more open main aisle in the warehouse.

At decision point 260, if the tag is within a certain distance of the RFID reader, for example, the distance is within the load space of the forklift, then at block 265, the tag and the package to which the tag is attached are considered as having been added to the load space.

If the system determines (block 260—No) that the tag is not within the load space, at block 235 the tag and package are not considered part of the load. This information can be stored in a database for use by the RFID system.

If the system determines (block 250—No) that the tag did not move and then become stationary within the read zone, then at decision point 270, it determines whether the tag was stationary within the read zone and then moved out of the read zone. If the system determines (block 270—Yes) that the tag was stationary within the read zone and then moved outside of the read zone, at block 275, the tag and corresponding package may be classified as either having been removed from the load, or the tag and package fell off of the forklift. This information can be stored in a database for use by the RFID system. However, if the system determines (block 270—No) that the tag was not stationary within the read zone and then moved outside of the read zone, at block 280 the tag is considered an extraneous tag and ignored. This case may arise if the RFID reader responds to stray RF reflections or RF noise.

In all of the above scenarios for the motion sensor detection process 200, after a tag has been classified as being part of a load (block 230), not part of a load (block 235), added to a load (block 260), removed from a load (block 275), or an extraneous tag (block 280), the process returns to block 205 where the motion sensor detects motion of the RFID reader again.

Both the volume sensor detection process 100 and the motion sensor detection process 200, may be adapted to accommodate the RFID system. For example, depending upon the speed of the forklift and/or the speed of processing RFID and SID information, multiple tags may be read and processed in each block that reads or processes an RFID tag. Thus, in the volume sensor detection process 100, multiple tags may be read and compared to a movement of the forklift, and in the motion sensor detection process 200, multiple tags may be read and their motion may be monitored to determine if the tags are moving or stationary within the read zone before re-detecting motion of the RFID reader again.

Figure 8:
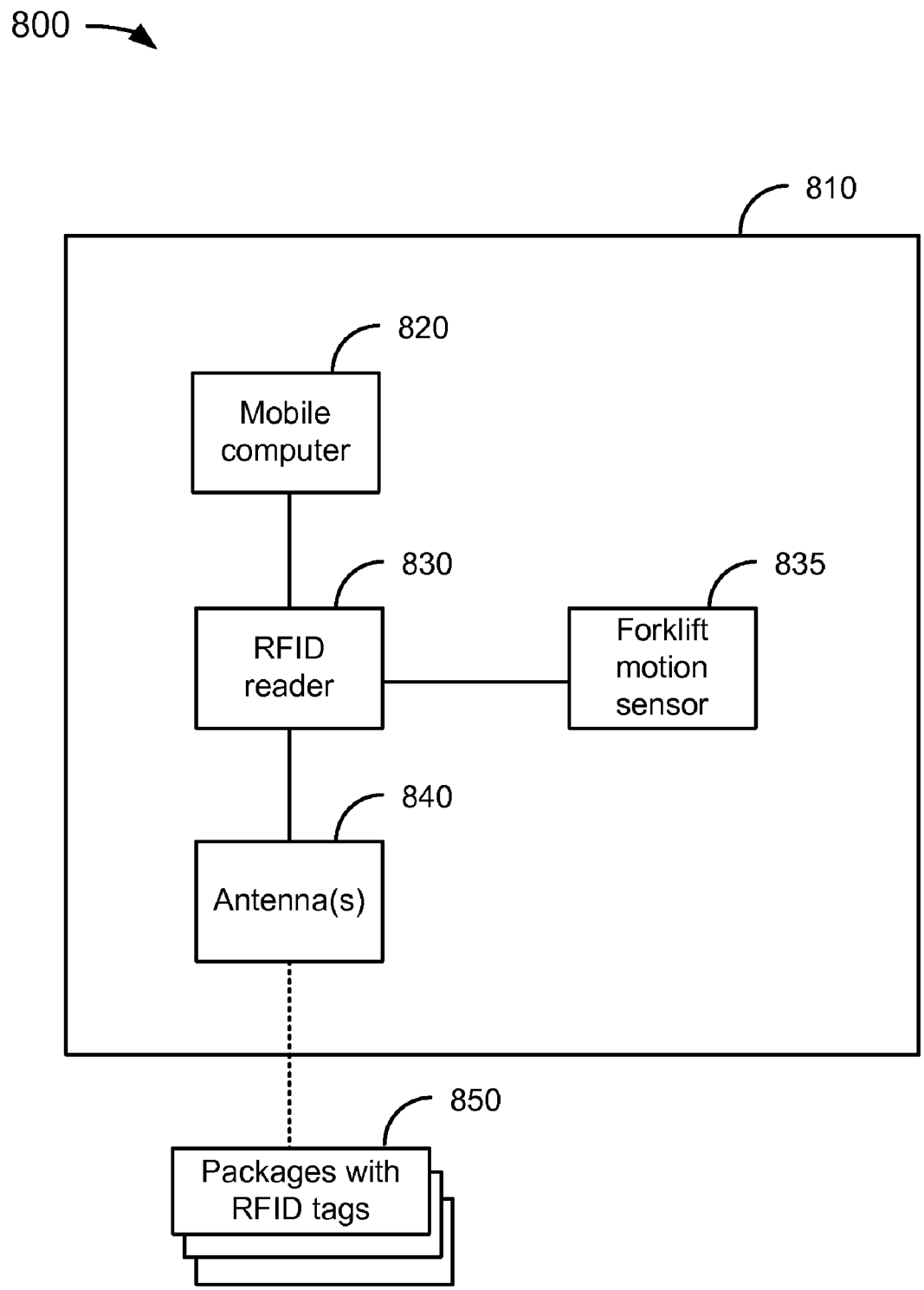
FIG. 8 shows a block diagram of an example RFID reader system.
Figure 9:
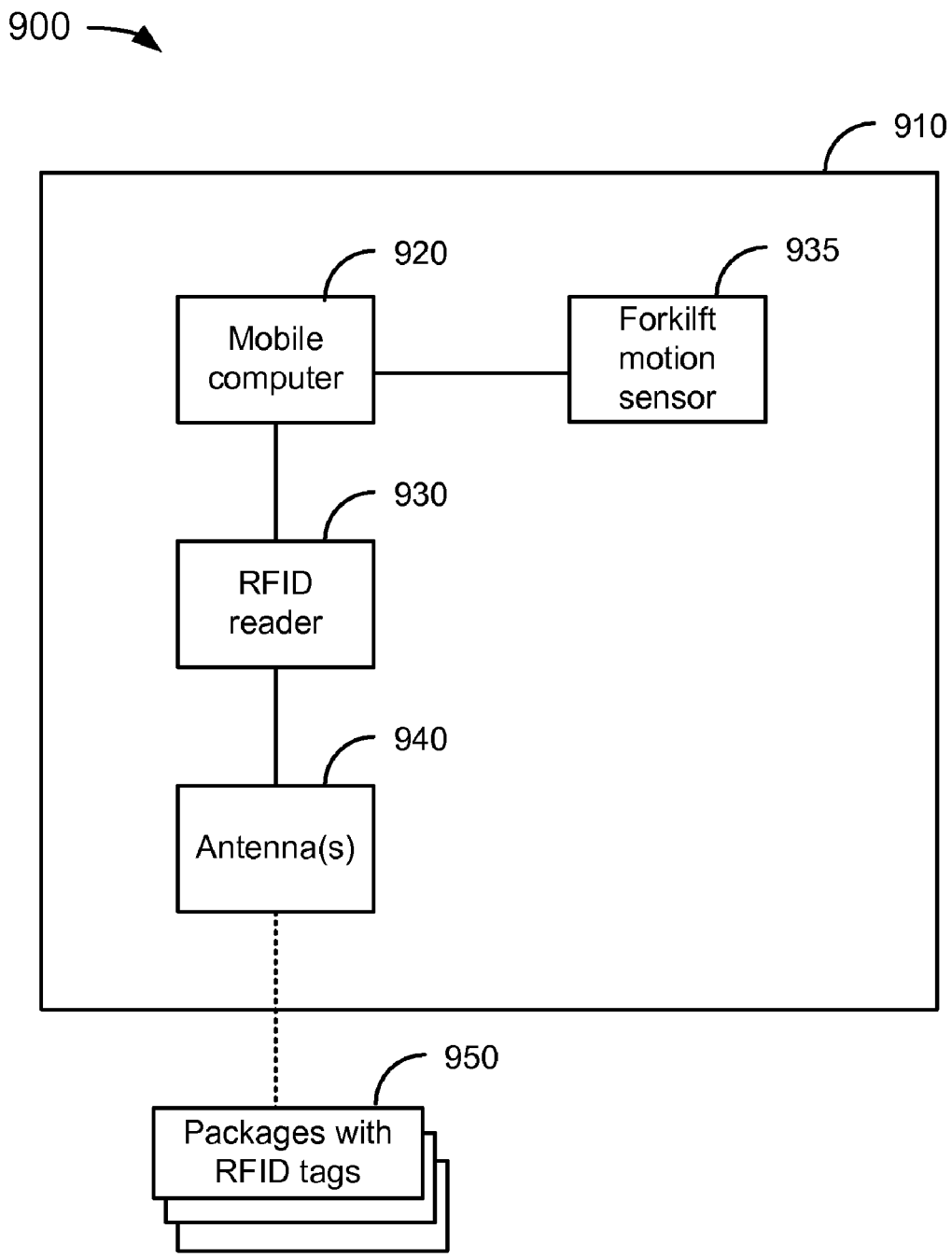
FIG. 9 shows another block diagram of an example RFID reader system.

FIGS. 8A and 9A show example block diagrams 800, 900 of a mobile RFID system 810, 910 used to read one or more packages with RFID tags 850, 950. With RFID system 810 in FIG. 8, a motion sensor 835 sends data directly to the RFID reader 830 for processing by the reader, while with RFID system 910 in FIG. 9, the motion sensor 935 sends data directly to the mobile computer 920 for processing. For the RFID system in FIG. 8, in one configuration if the RFID reader and the sensor 835 are mounted on the back rest of the load, then a sufficiently sensitive sensor can detect motion of the fork moving up and down. For the RFID system in FIG. 9, in one configuration, if the sensor and the computer are mounted in the body of the forklift truck, only motion of the forklift truck could be detectable. The RFID system 810 in FIG. 8 includes a mobile computer 820, an RFID reader 830, a motion sensor 835, and one or more RF antennas 840. Similarly, the RFID system 910 in FIG. 9 includes a mobile computer 920, an RFID reader 930, a motion sensor 935, and one or more RF antennas 940.

Note that FIGS. 8 and 9 and the associated discussions provide a brief, general description of a suitable computing environment in which the invention can be implemented. Although not required, aspects of the invention are described in the general context of computer-executable instructions, such as routines executed by a general-purpose computer, e.g., stationary and mobile computers. Those skilled in the relevant art will appreciate that the invention can be practiced with other communications, data processing, or computer system configurations, including: Internet appliances, handheld devices (including personal digital assistants (PDAs)), wearable computers, all manner of cellular or mobile phones, multi-processor systems, microprocessor-based or programmable consumer electronics, set-top boxes, network PCs, mini-computers, mainframe computers, server computers, and the like. Indeed, the terms "computer" and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. For example, the computer 820, 920 may be coupled via a network to other computers (not shown).

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Figure 10:
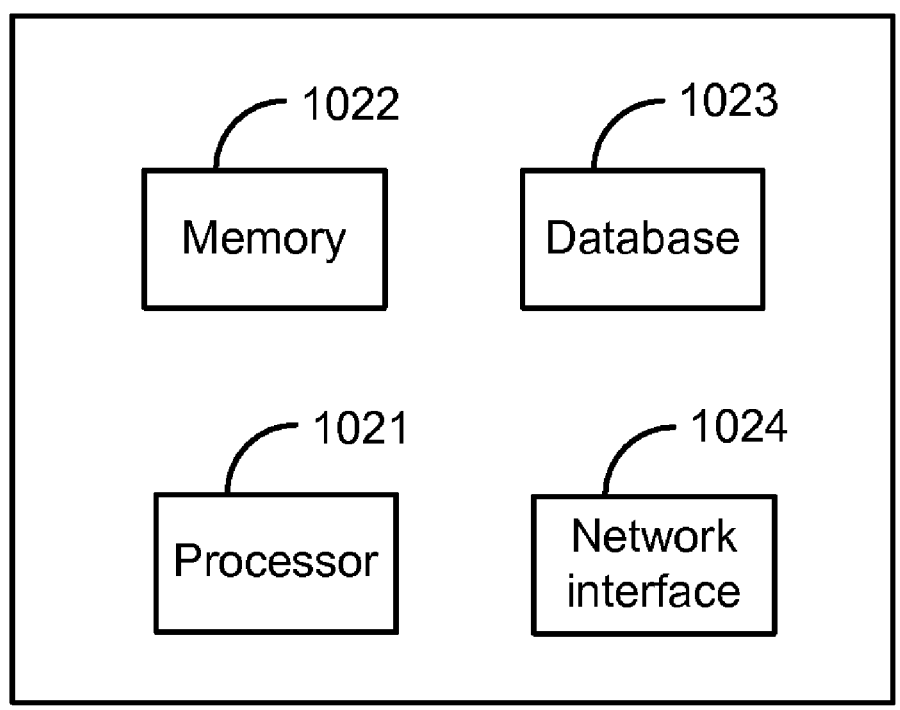
FIG. 10 shows a block diagram of an example mobile computer that can be used with an RFID reader to determine which RFID-tagged packages are on a forklift.

As shown in FIG. 10, the mobile computer 820, 920 includes a processor 1021 that may be used to run RFID reader applications that may be stored in the memory units 1022 and may process the RFID information and the spatial and/or motion information; memory units 1022 may include but are not limited to, RAM, ROM, and any combination of volatile and non-volatile memory; a database 1023 may be used for storing RFID information and/or customer order lists, where the database 1023 may be stored in the memory units 1022; and a network interface 1024 that enables information to be sent over a network such as RFID tag information and order lists. Examples of a network interface 1024 include, but are not limited to, modems such as cable, ADSL, or optical, interfaces that communicate through wireless frequencies or infrared frequencies, and network interface cards. Of course, the computer 820, 920 may include other elements (not shown), including input or output elements such as a printer, plotter, audio speakers, tactile or olfactory output devices, network connection, wireless transceiver, keyboard, pointing device (e.g. mouse), microphone, joystick, pen, game pad, scanner, digital camera, video camera, etc.

Locations at which the computer 820, 920 may reside include, but are not limited to, within an RFID reader on a forklift, at a mobile site, such as a handheld device carried by a warehouse worker, and at a remote site which may or may not be within the warehouse.

The RFID reader 830, 930 includes standard components for communication with RFID tags including one or more antennas 840, 940 for receiving and transmitting RF signals. The RFID reader 830, 930 can include a spatial sensor that senses items within a defined volume or area. Alternatively or additionally, the RFID reader 830, 930 can include a sensor for sensing motion of RFID tags. The RFID reader 830 in FIG. 8 includes a processor that can receive and process data from the motion sensor 835.

The motion sensor 835, 935 senses motion of the RFID reader 830, 930 and may be mounted on a mobile forklift so when the forklift moves, the RFID reader 830, 930 also moves. The sensor 835 may be integrated into the RFID reader 830 or be an independent unit in some embodiments.

The RFID tags 850, 950 may be attached to packages or other items or devices. A large number of tags may be located near each other and also around the warehouse or distribution center. The tags and packages may be in transit for many reasons including being carried by a forklift or person, being added to a forklift load, being removed from a forklift load, and falling off of a forklift. The RFID tags 850, 950 and corresponding packages may also be stationary in various locations such as on a stationary forklift, on a shelf, and in a queue waiting to be loaded onto a forklift. If an RFID tag 850, 950 is within the read zone of an RFID reader 830, 930, the RFID reader 830, 930 will be able to identify the tag and its location, unless the tag is an extraneous tag. In that case, the above described motion sensor detection process 200 that utilizes motion and spatial information may be able to accurately determine whether an identified RFID tag is an extraneous tag.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while an RFID reader for reading RFID tags are mentioned, any reading apparatus for reading devices emitting radio-frequency signals may be used under the principles disclosed herein.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

We claim:

1. A system for identifying a radio frequency identification (RFID) tag within a defined zone, comprising:
   an RFID reader configured to scan for an RFID tag within a read zone of the RFID reader, wherein the read zone at least partially overlaps with the defined zone, and wherein the defined zone is at a location near one or more antennas of the RFID reader;
   a sensor component configured to provide data to at least assist in determining positional data of the RFID tag relative to the RFID reader;
   a database storing the positional data and limits of the defined zone; and,
   a processor communicatively coupled to the RFID reader, the sensor component, and the database, wherein the processor is configured to
      compare the positional data from the sensor component with the defined zone limits to determine whether the RFID tag is within the defined zone, and
      store the determination in the database.

2. The system of claim 1 wherein the RFID reader is secured or removably secured to a vehicle, and wherein the read zone is movable with respect to the vehicle.

3. The system of claim 1 wherein the sensor component is an accelerometer or gyroscope.

4. The system of claim 1 wherein the defined zone is a load space of a forklift truck, and wherein the sensor component is configured to determine a position of the RFID tag.

5. The system of claim 1 wherein the sensor component uses spatial identification technology.

6. The system of claim 1 wherein the sensor component includes two or more RF antennas that have a known separation for determining a location of the RFID tag.

7. The system of claim 1 wherein the sensor component includes logic for determining a distance between the RFID reader and the RFID tag based upon a received signal strength.

8. The system of claim 1 wherein the processor is further configured to determine a phase between received signals from the RFID tag and to determine whether the RFID tag is in motion relative to the RFID reader based on a change in phase.

9. The system of claim 1 wherein the processor is further configured to determine whether the RFID tag is in motion relative to the RFID reader based on backscatter modulation.

10. A system for identifying an RFID tag within a movable load space, comprising:
    an RFID reader configured:
       to scan for an RFID tag within a read zone of the RFID reader and
       to determine a distance and an angle between the RFID reader and the RFID tag, wherein the read zone at least partially overlaps with the movable load space, and the movable load space is near the RFID reader;
    a data store storing the distance and the angle and limits of the movable load space;
    a processor communicatively coupled to the RFID reader and the data store, wherein the processor is configured to:
       compare the distance and the angle between the RFID reader and the RFID tag with the load space limits to determine whether the RFID tag is within the movable load space; and
       store the determination in the database.

11. The system of claim 10 wherein the load space moves with a forklift truck, and further wherein the RFID reader is secured or removably secured to the forklift truck.

12. The system of claim 10 wherein determining a distance and an angle between the RFID reader and the RFID tag comprises using wireless backscatter modulation.

13. The system of claim 10 wherein determining a distance and an angle between the RFID reader and the RFID tag comprises using multiple RF antennas having known separations to triangulate a position of the RFID tag.

14. The system of claim 10 wherein determining a distance and an angle between the RFID reader and the RFID tag comprises using received signal strength and logic to determine a distance between the RFID reader and the RFID tag.

15. A system for identifying an RFID tag within a defined zone, comprising:
an RFID reader configured to read an RFID tag;
means, coupled to the RFID reader, for determining positional data of the RFID tag; and,
means, coupled to the means for determining positional data, for determining whether the RFID tag is within a defined space based at least in part on the positional data determined from the means for determining positional data.

16. A system for distinguishing an RFID tag within a movable load space from at least one extraneous tag, the system comprising:
an RFID tag detector configured to scan for a first RFID tag within a detection zone of the RFID detector, wherein the detection zone at least partially overlaps with the load space;
a first sensor configured to monitor movement of the RFID detector;
a second sensor configured to monitor movement of the first RFID tag;
a processor communicatively coupled to the RFID detector, the first sensor, and the second sensor, wherein the processor is configured to
compare movement of the first RFID tag relative to movement of the RFID detector, and,
determine whether the first RFID tag is in the load space, is not in the load space, has been added to the load space, has been removed from the load space, or is an extraneous tag based upon the movement of the first RFID tag within the read zone.

17. The system of claim 16 wherein the load space moves with a forklift truck, and further wherein the RFID reader is secured or removably secured to the forklift truck.

18. The system of claim 16 wherein the first sensor receives a signal from a speedometer or other instrument of a vehicle carrying the load.

19. The system of claim 17 wherein the first sensor is configured to detect a predetermined movement profile corresponding to movement of the forklift truck.

20. The system of claim 16 wherein the second sensor uses spatial identification technology.

21. The system of claim 16 wherein the second sensor uses wireless backscatter modulation.

22. The system of claim 16 wherein the second sensor uses phase angle measurements.

23. A method of identifying an RFID tag within a movable and defined zone, the method comprising:
determining a position of the RFID tag;
comparing limits of the defined zone with the determined position of the RFID tag, wherein the defined zone moves relative to a set location; and,
determining whether the RFID tag is within the defined zone.

24. The system of claim 23 wherein determining a position of the RFID tag comprises using spatial identification technology.

25. The system of claim 23 wherein determining a position of the RFID tag comprises using backscatter modulation.

26. A method of distinguishing an RFID tag within a load from an extraneous tag, comprising:
monitoring movement of an RFID reader;
reading a first RFID tag;
monitoring movement of the first RFID tag within a read zone of the RFID reader; and,
determining whether the first RFID tag is part of the load, is not part of the load, has been added to the load, has been removed from the load, or is an extraneous tag based upon movement of the first RFID tag within the read zone.

27. The method of claim 26, further comprising performing a measurement of a distance between the RFID tag and the RFID reader.

28. The method of claim 26 wherein monitoring movement of the first RFID tag comprises measuring a phase angle change of a response of the first RFID tag.

29. The method of claim 26 wherein monitoring movement of an RFID reader comprises detecting a predetermined movement profile of the RFID reader.

30. A tangible computer-readable medium storing processing instructions for implementing an operation performed by a computer, the operation comprising:
monitoring movement of an RFID reader;
reading a first RFID tag;
monitoring movement of the first RFID tag within a read zone of the RFID reader; and,
determining whether the first RFID tag is part of the load, is not part of the load, has been added to the load, has been removed from the load, or is an extraneous tag based upon movement of the first RFID tag within the read zone.

31. The tangible computer-readable medium of claim 30, wherein the operation further comprises performing a measurement of a distance between the RFID tag and the RFID reader.

* * * * *